(12) United States Patent
Harris et al.

(10) Patent No.: US 6,467,731 B1
(45) Date of Patent: Oct. 22, 2002

(54) INTEGRATED SAMPLE RETURN CAPSULE

(75) Inventors: Edward Nathan Harris, Denver; Daniel R. Morgenthaler; Kenneth P. Romeo, both of Littleton, all of CO (US); Michael A. Sasdelli, Uxbridge, MA (US); Janine M. Thornton; Michael G. Thornton, both of Elizabeth, CO (US); William H. Willcockson, Morrison, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/532,587

(22) Filed: Mar. 22, 2000

Related U.S. Application Data

(60) Provisional application No. 60/126,077, filed on Mar. 24, 1999.

(51) Int. Cl.[7] .................................................. B64G 1/62
(52) U.S. Cl. ................................... 244/160; 244/158 A
(58) Field of Search .......................... 244/158 R, 158 A, 244/113, 160

(56) References Cited

U.S. PATENT DOCUMENTS 3,311,323 A * 3/1967 Cappel ........................ 244/160
3,606,212 A * 9/1971 Paine ...................... 244/160 X
3,997,899 A * 12/1976 Rolsma .............. 244/158 A X
5,310,592 A * 5/1994 Baker et al. ............ 244/160 X

* cited by examiner

Primary Examiner—Robert P. Swiatek
(74) Attorney, Agent, or Firm—Marsh Fischmann & Breyfogle LLP (57) ABSTRACT

An integrated sample return capsule for use in returning materials to Earth from space, such as core samples from other celestial bodies and experiments from orbiting platforms. The sample return capsule incorporates thermal protection, structural integrity and impact mitigation into a single system capable of safely and securely returning the materials without requiring decelerating parachutes. In one embodiment, the integrated sample return capsule includes a forward facing heat shield and a back shell attached to the rear of the heat shield. The heat shield and the back shell define an interior enclosure. The back shell includes an access, such as a door or a removable panel, there through to the interior enclosure. Materials to be returned may be sealed in a sample containment vault, and the sealed vault may be placed into the interior enclosure through the access. An optional support deck may be provided within the interior enclosure for receiving the sample containment vault and supporting the vault within the interior enclosure.

36 Claims, 5 Drawing Sheets

INTEGRATED SAMPLE RETURN CAPSULE

RELATED APPLICATION INFORMATION

This application claims the benefit of U.S. Provisional Application Serial No. 60/126,077, filed on Mar. 24, 1999.

FIELD OF THE INVENTION

The present invention generally relates to the field of reentry vehicles, and more particularly to an integrated sample return capsule for use in returning core samples and the like to Earth.

BACKGROUND OF THE INVENTION

An objective of sample return missions, such as the Mars Sample Return (MSR) mission, is to retrieve core samples and the like from other celestial bodies (e.g., Mars) and return the samples to Earth for analysis. A critical requirement of sample return missions is sample containment throughout Earth reentry. Due to the possibility of unknown hazards, it may be required that all samples be sufficiently contained and treated as potentially hazardous until proven otherwise, and unless sample containment can be verified en-route to Earth, samples may need to be sterilized in space or not returned. As may be appreciated, sterilization of samples in space prior to analysis on Earth may partially negate the scientific value of a sample return mission, particularly the desire to search for possible signs of living organisms or traces thereof in the samples. Full success of sample return missions from other celestial bodies therefore may depend upon the achievement and verification of sample containment. Additionally, sample containment is most problematic in the final phase of such missions, comprising entry of the sample return system into the upper atmosphere, its contact with Earth, and its final retrieval.

In addition to sample return missions from other celestial bodies, it may be desirable to rapidly and directly return experiments from space platforms in Earth orbit, such as the International Space Station, rather than wait for available return cargo space in a manned space vehicle (e.g., the Space Shuttle). Such rapid experiment return missions present many of the same requirements as sample return missions from other celestial bodies.

Some previously planned sample return missions have relied upon parachutes to slow the sample return capsule and thereby lower velocities prior to impact or aerocapture. However, due to the finite probability of parachute failure, success of sample containment for missions such as the MSR mission or rapid experiment return missions cannot rely on the proper deployment of decelerating parachutes. Therefore, sample return capsule designs incorporating a parachute may not be appropriate for the MSR mission and other missions.

Without decelerating parachutes for slowing capsule descent, high Earth impact velocities result, causing extremely high loading conditions upon impact of the capsule with the Earth's surface. Also, high aerothermal heating and significant aerodynamic loads are present in the upper atmosphere. While some prior designs for thermal protection and structural support of reentry vehicles exist, prior reentry vehicles have not provided a relatively lightweight, aerodynamically stable, impact mitigating integrated solution to the direct and safe return of samples from space without the use of decelerating parachutes.

SUMMARY OF THE INVENTION

Accordingly, a need exists for an integrated sample return capsule capable of directly and safely returning samples from space to Earth without relying on decelerating parachutes. The present invention discloses an integrated sample return capsule that incorporates thermal protection, structural integrity and impact mitigation into a single system capable of safely returning samples from space without requiring the use of decelerating parachutes.

According to one aspect of the present invention there is provided an integrated sample return capsule for use in returning materials disposed within a sealable sample containment vault to Earth from space. The integrated sample return capsule includes a forward facing heat shield and a back shell that is attached to the rear of the heat shield. Together, the back shell and the heat shield define an interior enclosure. The back shell includes an access (e.g., a door or a removable panel) there through to the interior enclosure. Once the materials to be returned are sealed in the sample containment vault, the sealed vault may be placed into the interior enclosure through the access. In one embodiment, an optional support deck is mounted within the interior enclosure. The optional support deck is adapted to receive the sample containment vault and support the vault within the interior enclosure.

The heat shield, back shell, and optional support deck are configured to provide an aerodynamically stable capsule that provides thermal protection, structural integrity and impact mitigation. In this regard, the forward facing heat shield may include a blunt forward nose portion and extend outwardly in a conical fashion therefrom to an aft rim. The heat shield may be comprised of an outer shell including an ablative first material (e.g., a rigid ablative material such as carbon/carbon, carbon/phenolic, carbon matrix composite, and ceramic matrix composite, or a nonrigid ablative material such as phenolic impregnated carbon ablator) and an inner insulating and crushable layer including an insulating and crushable second material (e.g., reticulated vitreous carbon foam, fibrous carbon insulation, non-fibrous graphite foam, ceramic foam, carbon felt, ceramic felt, and carbon aerogel). The back shell may, for example, comprise an ablative outer material (e.g., super lightweight ablator) over an underlying structure (e.g., an aluminum honeycomb sandwich panel or a composite structure), and may include a flat back portion (in which the access may be provided) and a conical annulus terminating in a fore rim in contact with the aft rim of the heat shield. The back shell may be attached to the heat shield by a plurality of brackets disposed within the interior enclosure and fastened to interior surfaces of the heat shield and back shell at various locations adjacent to their respective aft and fore rims. The optional support deck preferably supports the sample containment vault in a spaced relation with the inner layer and in a substantially centered position behind the blunt forward nose portion. The relatively thin heat shield permits the sample containment vault to be supported in a forward position by the support deck, thereby providing the capsule with a forward center of gravity and, thus, satisfactory aerodynamic stability.

During reentry, the heat shield provides thermal protection for samples within the sample containment vault through ablation of the outer shell and the insulating nature of the inner insulating and crushable layer. Upon Earth impact, damage to the sealed sample containment vault is reduced or eliminated through destructive cracking of the outer shell of the heat shield and crushing of the inner insulating and crushable layer. In order to provide additional thermal and impact protection, there may be a second layer of insulating and crushable material within the interior enclosure between the support deck/sample containment vault and the heat shield.

According to another aspect of the present invention there is provided an integrated sample return capsule for use in returning materials to Earth from space. The integrated sample return capsule includes a forward facing outer face sheet comprised of an ablative first material (e.g., a rigid ablative material such as carbon/carbon, carbon/phenolic, carbon matrix composite, and ceramic matrix composite, or a non-rigid ablative material such as phenolic impregnated carbon ablator). A back shell (e.g., super lightweight ablator over an aluminum honeycomb sandwich panel or a composite structure) is attached to the outer face sheet rearward thereof, and together the back shell and the outer face sheet define an interior enclosure there between. A first layer of an insulating and crushable second material (e.g., reticulated vitreous carbon foam, fibrous carbon insulation, non-fibrous graphite foam, ceramic foam, carbon felt, ceramic felt, and carbon aerogel) within the interior enclosure backs at least a forward portion of the outer face sheet, and a second layer of an insulating and crushable third material (e.g., reticulated vitreous carbon foam, fibrous carbon insulation, non-fibrous graphite foam, ceramic foam, carbon felt, ceramic felt, and carbon aerogel) within the interior enclosure backs at least the first layer. A sealable sample containment vault is disposed within the interior enclosure and is supported by at least one of the first and second layers of insulating and crushable material. The sample containment vault may be spherically shaped and there may be a corresponding hemispherical cut-out in one or both of the first and second layers into which the forward portion of the sample containment vault is fit. The back shell may include an access (e.g., a door or a removable panel) there through to the interior enclosure thereby allowing placement of materials into the sample containment vault and sealing of the vault prior to reentry (and removal of the vault after impact). Alternatively, materials being returned may be sealed in the sample containment vault and the vault positioned in the interior enclosure prior to attachment of the back shell.

According to one more aspect of the present invention, there is provided an integrated sample return capsule for use in returning materials to Earth from space that includes a forward facing heat shield and a back shell attached to the rear of the heat shield. The back shell and the heat shield define an interior enclosure there between. There may be an optional support deck mounted within the interior enclosure and a sealable sample containment vault may disposed within the interior enclosure and supported therein on the support deck. Materials to be returned may be placed within the sample containment vault through an access (e.g., a door or a removable panel) in the back shell to the interior enclosure and the vault may then be sealed prior to reentry. Alternatively, if no access is provided to the interior enclosure, materials being returned may be sealed in the sample containment vault and the vault positioned on the support deck prior to attachment of the back shell.

These and other aspects and advantages of the present invention will be readily apparent to one skilled in the art from the following figures, descriptions, and claims.

DESCRIPTION OF THE DRAWINGS

For a more complete understanding of the present invention and the advantages thereof, reference is now made to the following description taken in conjunction with the accompanying drawings, wherein like referenced numerals represent like parts, in which.

DETAILED DESCRIPTION

Figure 1:
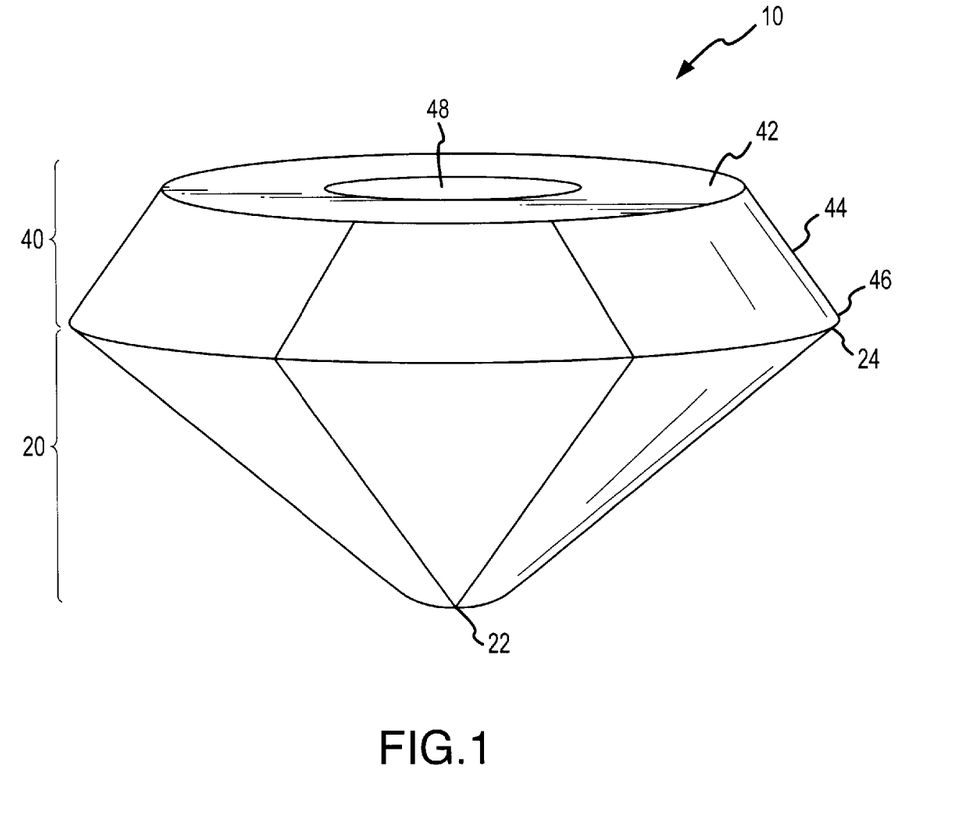
FIG. 1 is a perspective view showing one embodiment of an integrated sample return capsule in accordance with the present invention.
Figure 2:
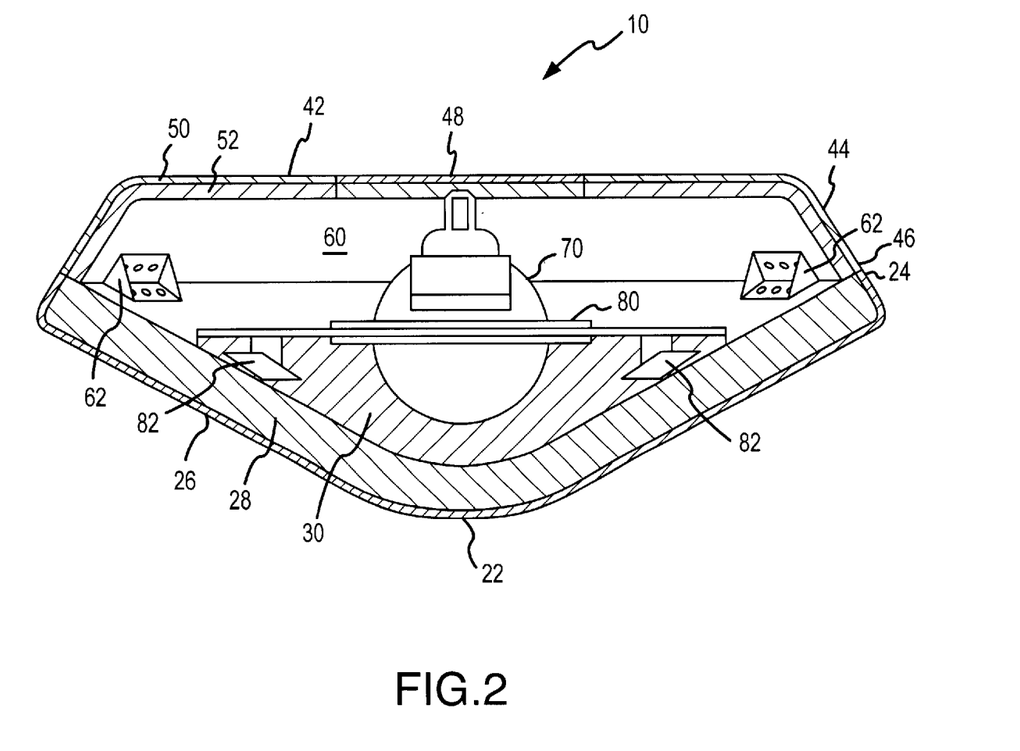
FIG. 2 is a cross-sectional view of the integrated sample return capsule of FIG. 1.

Referring now to FIGS. 1 and 2, there are shown perspective and crosssectional views, respectively, of one embodiment of an integrated sample return capsule 10 in accordance with the present invention. The sample return capsule 10 includes a forward facing heat shield 20 and a back shell 40 rearward of the heat shield 20 (the heat shield 20 is shown facing down in FIGS. 1 and 2). The heat shield includes a generally blunt forward nose portion 22 and extends outwardly in a conical fashion from the blunt nose portion 22 to an aft rim 24 thereof. The back shell 40 may have a generally flat back 42 and a conical annular side 44 terminating in a fore rim 46. The fore rim 46 of the back shell 40 contacts the aft rim 24 of the heat shield 20 to define an interior enclosure 60 between interior surfaces of the heat shield 20 and the back shell 40. The back shell 40 is secured to the heat shield 20 by, for example, a plurality of brackets 62 attached (e.g., by fasteners extending through transverse surfaces of the bracket into the heat shield 20 and back shell 40) to the interior surfaces of the heat shield 20 and the back shell 40 at selected locations near the aft and fore rims 24, 46 thereof. It should be appreciated that the back shell 40 may be attached to the heat shield 20 in other manners as well, such as, for example, adhesive bonding or a separation mechanism.

Disposed within the enclosure 60 there is a sealable sample containment vault 70 comprised of steel and/or other materials. The sample containment vault 70 is supported on a support deck 80 in a spaced relation from the interior surface of the heat shield 20. The support deck 80 may be comprised of relatively lightweight composite materials, such as carbon fiber, and/or metallic materials, such as aluminum or steel. The sample containment vault 70 may, as is shown, be generally spherical in shape, and soil samples or the like may be sealed therein for return to Earth. An access door 48 or removable panel or the like in the flat back 42 of the back shell 40 provides access to the interior enclosure 60 of the integrated sample return capsule 10 and permits the sample containment vault 70 to be placed in the interior enclosure 60 prior to reentry and removed from the interior enclosure 60 after Earth impact.

The heat shield 20 includes a relatively thin outer shell 26 backed by a thicker inner insulating and crushable layer 28. The outer shell 26 is comprised of an ablative first material and the inner insulating and crushable layer 28 is comprised of an insulating and crushable second material. Depending upon mission parameters (e.g., expected atmospheric heating and aerothermal loading conditions), the ablative first material comprising the outer shell 26 may, for example, be a rigid ablative material such as carbon/carbon, carbon/phenolic, carbon matrix composite, and ceramic matrix composite (e.g., silicon carbide with carbon fibers) or a non-rigid ablative material such as phenolic impregnated carbon ablator (PICA). In this regard, when the ablative first material comprising the outer shell 26 is a non-rigid ablative material such as PICA, the heat shield 20 may include a thin middle layer (not shown) of a rigid ablative material (e.g., carbon/carbon) between to outer shell 26 and the inner insulating and crushable layer 28 to enhance the structural integrity of the heat shield 20. While the thickness of the outer shell 26 may be adjusted depending upon the ablative first material used and anticipated mission parameters, in the illustrated embodiment the outer shell comprises 0.1 inch thick carbon/carbon. In the illustrated embodiment, the second insulating and crushable material comprising the inner insulating and crushable layer 28 is reticulated vitreous carbon (RVC) foam. However, depending upon mission parameters, the second insulating and crushable material may comprise other insulating and crushable materials such as fibrous carbon insulation (e.g., Fiberform® commercially available from Fiber Materials, Inc. in Elk Grove Village, Ill. or Calcarb™ commercially available from Calcarb in Rancocos, N.J.), non-fibrous graphite foam (e.g., Cal-Foam® commercially available from SGL Technic in Valencia, Calif.), ceramic foam, carbon felt, ceramic felt, and carbon aerogel.

The relatively high strength and stiffness as well as high thermal conductivity of the carbon/carbon comprising the outer shell 26 permits the outer shell 26 to serve as both the main structural member of the sample return capsule 10 and the ablative portion of the sample return capsule 10 during reentry. The low density, low thermal conductivity, and energy absorbing crush behavior of the RVC foam comprising the inner insulating and crushable layer 28 of the heat shield 20 provides thermal and impact isolation for the sample containment vault 70 while minimizing the overall mass of the sample return capsule 10. The carbon/carbon outer shell 26 and the RVC foam inner insulating and crushable layer 28 may be joined with a phenolic loaded scrim cloth which is carbonized to facilitate adhesion of the outer shell 26 and inner insulating and crushable layer 28 and remove the phenolic volatiles.

In order to provide additional thermal and impact isolation for the sample containment vault 70, there may be a second layer 30 of insulating and crushable material (e.g., RVC foam) disposed between the inner surface of the heat shield 20 and the sample containment vault 70 and support deck 80. The second layer 30 may include a hemispherical cut-out, which may be lined with a fibrous reinforcing material (e.g., Kevlar® commercially available from Du Pont Fibers in Willmington, Del.) for receiving the lower hemisphere of the sample containment vault 70. As is shown, the lower hemisphere of the sample containment vault and the support deck may be supported directly upon the second layer 30 of RVC foam. Additionally, the support deck 80 may include a plurality of brackets 82 adjacent to the outer periphery of the support deck 80 that are received through additional cut-outs in the second layer 30 and are mounted on the interior surface of the heat shield 20.

The back shell 40 may be comprised of an ablative outer material 50 (e.g., super lightweight ablator) over an underlying structure 52 (e.g., an aluminum honeycomb sandwich panel or a composite structure). Additional thermal and crush protection for the sample containment vault may be provided by disposing a rearward layer 90 of an insulating and crushable material (e.g., RVC foam) within the interior enclosure 60 between the interior of back 42, side 44 and door 48 of the back shell 40 and the sample containment vault 70, as is illustrated in FIG. 3.

As may be appreciated, an enabling feature of the integrated sample return capsule 10 is the relatively low overall thickness of the heat shield 10. In contrast with a design incorporating a thicker heat shield, the relatively thin heat shield 20 of the integrated sample return capsule 10 permits placement of the sample containment vault 70 as far forward as practicable and substantially centered behind the blunt forward nose portion 22 of the heat shield 20. Since the loaded sample containment vault 70 represents the heaviest portion of the integrated sample return capsule 10, its forward, central placement ensures that the center of gravity of the integrated sample return capsule 10 is substantially centered and as far forward as practicable, thereby providing the integrated sample return capsule 10 with good aerodynamic stability during reentry.

In addition to providing aerodynamic stability, the design of the integrated sample return capsule 10 also minimizes loads on the sample containment vault 70 and bounce back velocity upon Earth impact through destructive cracking of the carbon/carbon outer shell 26 and crushing of the inner and second layers 28, 30 of RVC foam.

Figure 3:
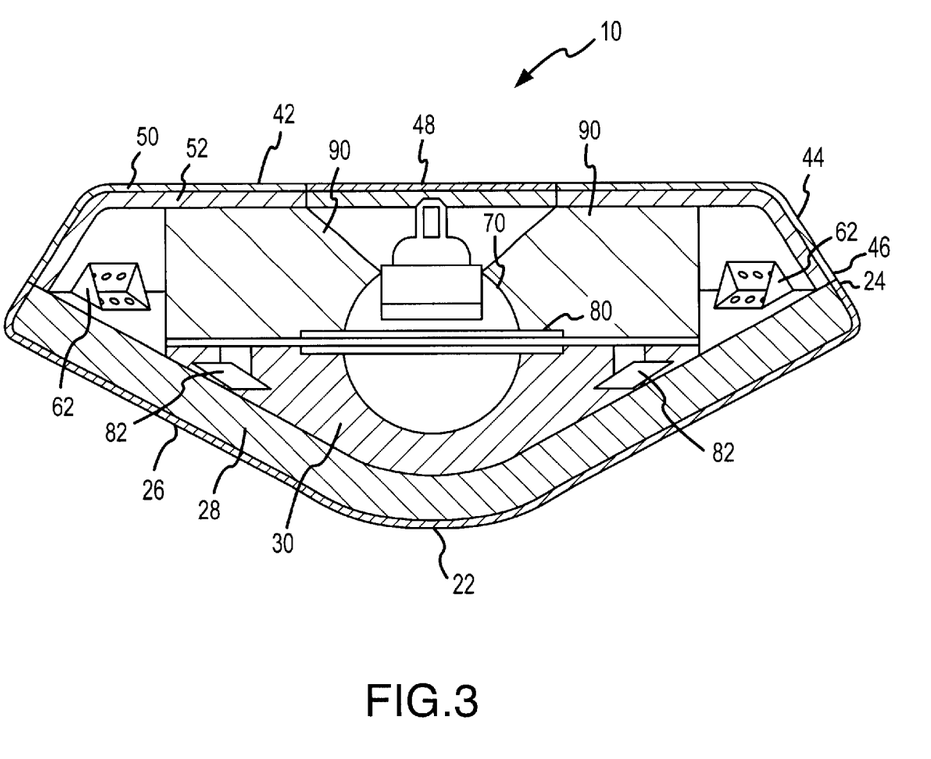
FIG. 3 is a cross-sectional view of the integrated sample return capsule of FIG. 1 having an additional layer of insulating and crushable material.
Figure 4:
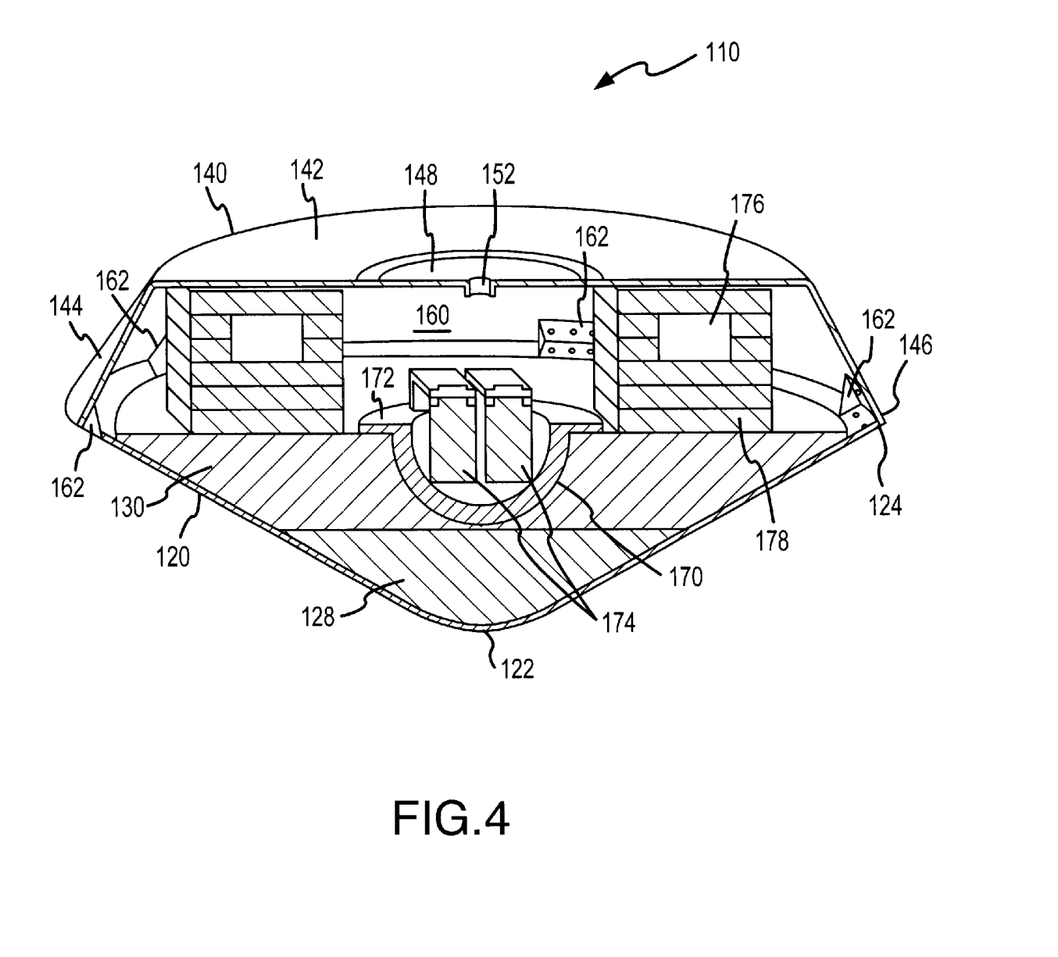
FIG. 4 is a perspective cross-sectional view of another embodiment of an integrated sample return capsule in accordance with the present invention.

Referring now to FIGS. 3 and 4, there are shown perspective cross-sectional and cross-sectional views, respectively, of another embodiment of an integrated sample return capsule 110 in accordance with the present invention. The embodiment shown in FIGS. 3 and 4 was specifically designed for purposes of testing (e.g., droptesting of similarly constructed prototypes from a hot air balloon). However, some aspects of this embodiment may also be appropriate for actual sample return missions.

Figure 5:
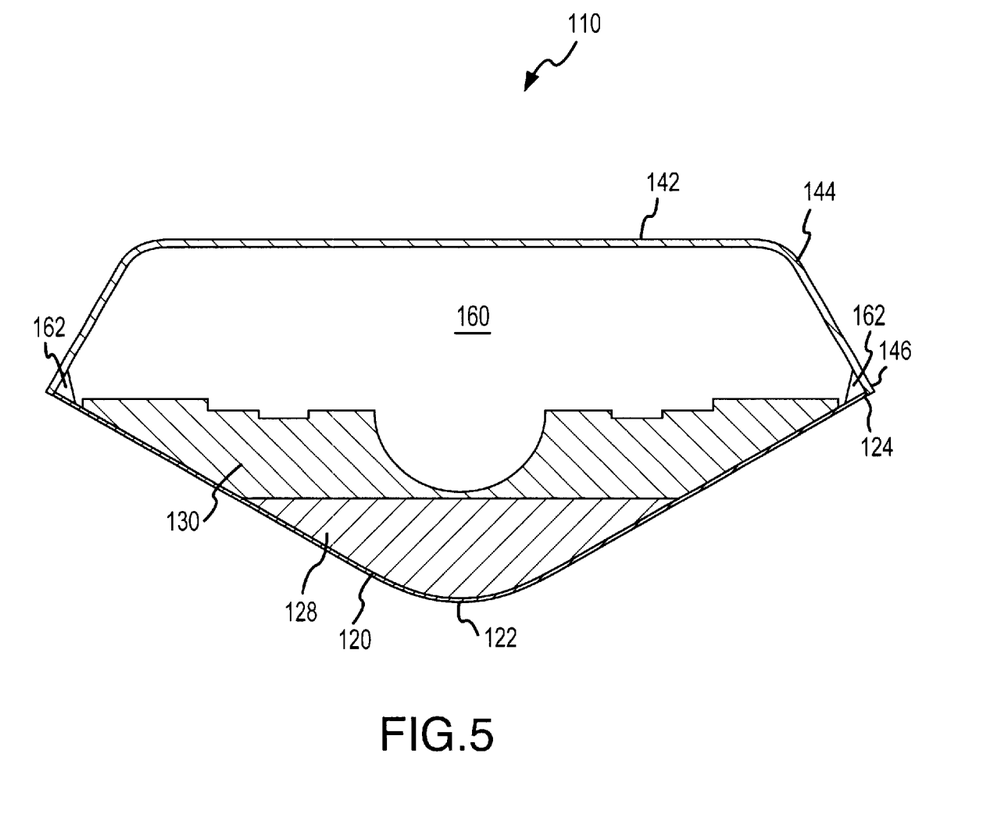
FIG. 5 is a cross-sectional view of the integrated sample return capsule of FIG. 4 shown without the sample return vault and additional instrumentation.

The integrated sample return capsule 110 includes a forward facing outer face sheet 120 backed by first and second layers of insulating and crushable material 128, 130. The forward facing outer face sheet 120 includes a generally blunt forward nose portion 122 and extends outwardly in a conical fashion from the blunt nose portion 122 to an aft rim 124 thereof. The outer face sheet 120 is comprised of an ablative first material such as, for example, carbon/carbon, carbon/phenolic, carbon matrix composite, or ceramic matrix composite. While the thickness of the outer face sheet 120 varies depending upon the ablative first material and anticipated mission parameters, in one embodiment, the outer face sheet 120 comprises 0.1 inch thick carbon/carbon. The first and second insulating and crushable layers 128, 130 are comprised of an insulating and crushable second material such as, for example, reticulated vitreous carbon foam, fibrous carbon insulation (e.g., Fiberform® or Calcarb™), non-fibrous graphite foam (e.g., Cal-Foam®), ceramic foam, carbon felt, ceramic felt, and carbon aerogel.

The integrated sample return capsule 110 also includes a back shell 140 rearward of the forward facing outer face sheet 120. The back shell 140 includes a generally flat back 142 and a conical annular side 144 terminating in a fore rim 146. In the prototypes constructed for testing purposes, the back shell 140 was comprised of 0.09 inch thick aluminum. The fore rim 146 of the back shell 140 contacts the aft rim 124 of the outer face sheet 120 to define an interior enclosure 160 within which the first and second layers 128, 130 of insulating and crushable material 130 are disposed. The back shell 140 is secured to the outer face sheet 120 by, for example, a plurality of brackets 162 attached to the interior surfaces of the outer face sheet 120 and the back shell 140 at selected locations near the aft and fore rims 124, 146 thereof. The back shell 140 includes an access door 148 or removable panel or the like in the flat back 142 portion thereof. The access door 140 permits access to the interior enclosure 160. The access door 148 in the back shell 140 may include an attachment point 152 for use in lifting the integrated sample return capsule 110 (e.g. when lifting it in a hot air balloon for drop-testing a prototype).

Using the access door 148, a sample containment vault 170 may be placed within the enclosure. In the illustrated embodiment, the sample containment vault 170 is a steel hemisphere with circular flange 172 and is open to the rear. No support deck is included in this embodiment of the integrated sample return capsule 110. Rather, the sample containment vault 170 rests directly in a hemispherical cut-out in the second layer of insulating and crushable material 130 with the flange 172 supported by the upper surface of the second layer 130. The particular sample containment vault 170 shown was developed for testing purposes. However, it will be appreciated that a sealable spherical sample containment vault similar to that shown in FIG. 2 or another appropriately configured sample containment vault may be placed in the interior enclosure 160.

As is shown in FIG. 4, for purposes of testing, digital data recorder units 174 may be located in the hemispherical sample containment vault 170 to record data relating to the aerodynamic behavior and impact acceleration of the integrated sample return capsule 110. Instrumentation 176 for collecting the aerodynamic behavior and impact acceleration data may be disposed in the interior enclosure 160, protected by stacks 178 of an impact protective material (e.g., Rohacell® foam commercially available from CYRO Industries in Rockaway, N.J.). Data gathered by the instrumentation 176 and recorded by the data recorders 174 (e.g., during drop testing of an integrated sample return capsule 170 from an altitude of 3000 feet above ground level), as well as visual inspection, may be (and has been) used to verify the capabilities of the integrated sample return capsule of present invention, including its aerodynamic stability and impact mitigation.

Although the present invention has been described in several embodiments, various changes and modifications may be suggested to one skilled in the art. It is intended that the present invention encompass such changes and modifications that fall within the scope of the appended claims.

What is claimed is:

1. An integrated sample return capsule for use in returning materials disposed within a sealable sample containment vault to Earth from space, said integrated sample return capsule comprising:
    a forward facing heat shield, said heat shield comprising an insulating and crushable layer including an insulating and crushable material, and a shell on an outer side of said insulating and crushable layer, said shell including an ablative material;
    a back shell rearward of and attachable to said heat shield, wherein said back shell and said heat shield define an interior enclosure therebetween, and wherein said back shell includes an access therethrough permitting disposition of the sample containment vault within said interior enclosure; and
    a support deck mountable within said interior enclosure, said support deck being adapted to support the sample containment vault within said interior enclosure upon disposition of the sample containment vault within said interior enclosure.

2. The integrated sample return capsule of claim 1 wherein said ablative material comprises one of carbon/carbon, carbon/phenolic, carbon matrix composite, and ceramic matrix composite.

3. The integrated sample return capsule of claim 1 wherein said ablative material comprises phenolic impregnated carbon ablator.

4. The integrated sample return capsule of claim 1 wherein said insulating and crushable material comprises one of reticulated vitreous carbon foam, fibrous carbon insulation, non-fibrous graphite foam, ceramic foam, carbon felt, ceramic felt, and carbon aerogel.

5. The integrated sample return capsule of claim 1 wherein said back shell comprises an ablative outer material over an underlying structure.

6. The integrated sample return capsule of claim 5 wherein said back shell comprises super lightweight ablator over one of an aluminum honeycomb sandwich panel and a composite structure.

7. The integrated sample return capsule of claim 1 wherein said support deck is adapted to support the sample containment vault in a spaced relation with an inner surface of said forward facing heat shield.

8. The integrated sample return capsule of claim 7 further comprising:
    a layer of insulating and crushable material disposed within said interior enclosure between said inner surface of said heat shield and said support deck.

9. The integrated sample return capsule of claim 8 wherein said layer of insulating and crushable material disposed within said interior enclosure comprises one of reticulated vitreous carbon foam, fibrous carbon insulation, non-fibrous graphite foam, ceramic foam, carbon felt, ceramic felt, and carbon aerogel.

10. An integrated sample return capsule for use in returning materials disposed within a sealable sample containment vault to Earth from space, said integrated sample return capsule comprising:
    a forward facing heat shield, wherein said forward facing heat includes a blunt forward nose portion and extends outwardly in a conical fashion from said blunt forward nose portion to an aft rim thereof;
    a back shell rearward of and attachable to said heat shield, wherein said back shell and said heat shield define an interior enclosure therebetween, wherein said back shell includes an access therethrough permitting disposition of the sample containment vault within said interior enclosure, and wherein said back shell includes a flat back portion and a conical annulus terminating in a fore rim in contact with said aft rim of said heat shield; and
    a support deck mountable within said interior enclosure, said support deck being adapted to support the sample containment vault within said interior enclosure upon disposition of the sample containment vault within said interior enclosure.

11. The integrated sample return capsule of claim 10 wherein said support deck is adapted to support the sample containment vault in a substantially centered position behind said blunt forward nose portion.

12. The integrated sample return capsule of claim 10 wherein said access comprises one of a door and a removable panel included in said flat back portion of said back shell.

13. The integrated sample return capsule of claim 10 further comprising:
    a plurality of brackets disposed within said interior enclosure, said brackets being fastened to interior surfaces of said heat shield and said back shell at various locations adjacent to said aft and fore rims to thereby attach said back shell to said heat shield.

14. An integrated sample return capsule for use in returning materials to Earth from space comprising:
    a forward facing outer face sheet comprising an ablative first material;

a back shell rearward of and attachable to said outer face sheet, wherein said back shell and said outer face sheet define an interior enclosure there between;

a first layer of an insulating and crushable second material within said interior enclosure and backing at least a forward portion of said forward facing outer face sheet;

a second layer of an insulating and crushable third material within said interior enclosure and backing at least said first layer; and a sealable sample containment vault within which materials to be returned are disposable, wherein said sample containment vault is disposable within said interior enclosure and is supportable by at least one of said first and second layers.

15. The integrated sample return capsule of claim 14 wherein said back shell includes an access there through to said interior enclosure through which samples to be returned are disposable into said sample containment vault.

16. The integrated sample return capsule of claim 14 wherein said forward facing outer face sheet includes a blunt forward nose portion and extends outwardly in a conical fashion from said blunt forward nose portion to an aft rim thereof.

17. The integrated sample return capsule of claim 14 wherein said ablative first material comprises one of carbon/carbon, carbon/phenolic, carbon matrix composite, and ceramic matrix composite.

18. The integrated sample return capsule of claim 14 wherein said insulating and crushable second and third materials comprise one of reticulated vitreous carbon foam, fibrous carbon insulation, non-fibrous graphite foam, ceramic foam, carbon felt, ceramic felt, and carbon aerogel.

19. The integrated sample return capsule of claim 14 wherein said back shell comprises an ablative outer material over an underlying structure.

20. The integrated sample return capsule of claim 19 wherein said back shell comprises super lightweight ablator over one of an aluminum honeycomb sandwich panel and a composite structure.

21. The integrated sample return capsule of claim 14 wherein said sample containment vault is spherical and at least said second layer includes a hemispherical cut-out receiving at least a portion of said sample containment vault.

22. An integrated sample return capsule for use in returning materials to Earth from space comprising:

a forward facing heat shield, wherein said heat shield includes an outer shell including an ablative first material and an inner insulating and crushable layer including an insulating and crushable second material;

a back shell rearward of and attachable to said heat shield, wherein said back shell and said heat shield define an interior enclosure therebetween; and a sealable sample containment vault within which materials to be returned are disposable, wherein said sample containment vault is disposable within said interior enclosure and supportable by said inner insulating and crushable layer.

23. The integrated sample return capsule of claim 22 further comprising:

a deck disposable within said interior enclosure, wherein said deck is adapted to receive said sample containment vault.

24. The integrated sample return capsule of claim 23 wherein said deck is mountable on an inner surface of said inner insulating and crushable layer.

25. The integrated sample return capsule of claim 23 wherein said back shell includes an access therethrough to said interior enclosure through which samples to be returned are disposable into said sealable sample containment vault.

26. The integrated sample return capsule of claim 23 wherein said forward facing heat includes a blunt forward nose portion and extends outwardly in a conical fashion from said blunt forward nose portion to an aft rim thereof.

27. The integrated sample return capsule of claim 26 wherein said deck supports said sample containment vault in a substantially centered position behind said blunt forward nose portion.

28. The integrated sample return capsule of claim 23 wherein said deck supports said sample containment vault in a spaced relation with an inner surface of said forward facing heat shield.

29. The integrated sample return capsule of claim 28 further comprising:

a second layer of an insulating and crushable material disposable within said interior enclosure between said inner surface of said heat shield and said deck.

30. The integrated sample return capsule of claim 29 wherein said second layer of insulating and crushable material comprises one of reticulated vitreous carbon foam, fibrous carbon insulation, non-fibrous graphite foam, ceramic foam, carbon felt, ceramic felt, and carbon aerogel.

31. The integrated sample return capsule of claim 29 wherein said deck supports said sealable sample containment vault in a spaced relation with an inner surface of said back shell, and wherein said integrated sample return capsule further comprises:

a third layer of insulating and crushable material disposable within said interior enclosure between said sealable sample containment vault and said inner surface of said back shell.

32. The integrated sample return capsule of claim 22 wherein said ablative first material comprises one of carbon/carbon, carbon/phenolic, carbon matrix composite, and ceramic matrix composite.

33. The integrated sample return capsule of claim 22 wherein said ablative first material comprises phenolic impregnated carbon ablator.

34. The integrated sample return capsule of claim 22 wherein said insulating and crushable second material comprises one of reticulated vitreous carbon foam, fibrous carbon insulation, non-fibrous graphite foam, ceramic foam, carbon felt, ceramic felt, and carbon aerogel.

35. The integrated sample return capsule of claim 22 wherein said back shell comprises an ablative outer material over an underlying structure.

36. The integrated sample return capsule of claim 35 wherein said back shell comprises super lightweight ablator over an aluminum honeycomb sandwich panel.

* * * * *

UNITED STATES PATENT AND TRADEMARK OFFICE
CERTIFICATE OF CORRECTION

PATENT NO.   : 6,467,731 B1
DATED        : October 22, 2002
INVENTOR(S)  : Harris et al.

It is certified that error appears in the above-identified patent and that said Letters Patent is hereby corrected as shown below:

Column 8,
Line 31, after the word "heat", insert -- shield --;

Column 10,
Line 12, after the word "heat", insert -- shield --;

Signed and Sealed this

Eighteenth Day of February, 2003

JAMES E. ROGAN
*Director of the United States Patent and Trademark Office*